United States Patent [19]

Thackara et al.

[11] Patent Number: 5,006,285
[45] Date of Patent: Apr. 9, 1991

[54] ELECTRO-OPTIC CHANNEL WAVEGUIDE

[75] Inventors: John I. Thackara, Sunnyvale; George F. Lipscomb, Palo Alto, both of Calif.; Hyun-Nam Yoon, New Providence; Ronald N. De Martino, Wayne, both of N.J.

[73] Assignee: Lockheed Missiles & Space Company, Inc., Sunnyvale, Calif.

[21] Appl. No.: 225,450

[22] Filed: Jul. 28, 1988

[51] Int. Cl.[5] .................... G02F 1/00; B29C 71/04
[52] U.S. Cl. .................... 264/1.3; 264/1.4; 264/22; 264/24; 307/425; 350/96.12; 350/96.34
[58] Field of Search ............ 264/22, 1.4, 1.5, 1.3, 264/24, 104, 108; 307/425; 350/96.12, 96.34; 252/582

[56] References Cited

U.S. PATENT DOCUMENTS

| 3,795,433 | 3/1974 | Channin | 350/96 |
|---|---|---|---|
| 3,801,185 | 4/1974 | Ramaswamy et al. | 350/160 |
| 3,802,760 | 4/1974 | Sosnowski | 350/96 |
| 3,813,265 | 5/1974 | Marks | 264/1.3 |
| 4,140,369 | 2/1979 | Howland | 264/24 |
| 4,455,267 | 6/1984 | Strahan et al. | 264/1.3 |
| 4,591,465 | 5/1986 | Miyata et al. | 264/24 |
| 4,624,872 | 11/1986 | Stuetz | 428/1 |
| 4,792,208 | 12/1988 | Ulman et al. | 264/1.3 |
| 4,886,538 | 12/1989 | Mahapatra | 264/1.3 |

FOREIGN PATENT DOCUMENTS

| 58-171020 | 10/1983 | Japan | 264/1.5 |
|---|---|---|---|
| 58-190903 | 11/1983 | Japan | 264/1.5 |
| 60-175010 | 9/1985 | Japan | 264/1.5 |

OTHER PUBLICATIONS

Meredith, Van Dusen & Williams–Optical and Nonlinear Optical Characterization of Molecularly Doped Thermotropic Liquid Crystalline Polymers, Jan. 26, 1982, pp. 1385-1389.

Primary Examiner—Jeffery Thurlow
Attorney, Agent, or Firm—John J. Morrissey

[57] ABSTRACT

A three-dimensional electro-optic waveguide is formed as a channel in a structure made of an organic non-linear optical polymer. A poling electric field is maintained in a portion of the polymer structure defining the channel, and the polymer structure is heated above the glass-transition temperature to enable dipolar moieties of the polymer to become aligned by the poling field. Heating continues until the dipolar moieties are sufficiently aligned to produce a higher index of refraction in the channel portion than in adjacent cladding portions of the polymer structure for at least one polarization of optical radiation propagating through the channel. The poling field is maintained as the polymer structure is then cooled below glass-transition temperature, thereby preserving alignment of the dipolar moieties (and hence preserving the differential index of refraction) in the channel portion of the polymer structure. Guided modes of optical radiation of at least one polarization can be supported in the channel.

9 Claims, 7 Drawing Sheets

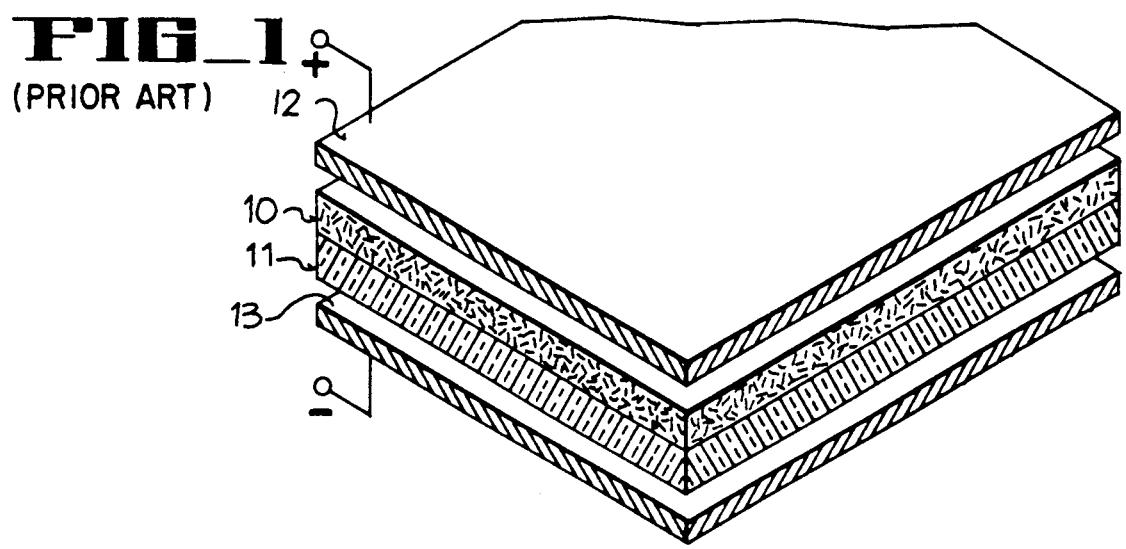
FIG_1 (PRIOR ART)
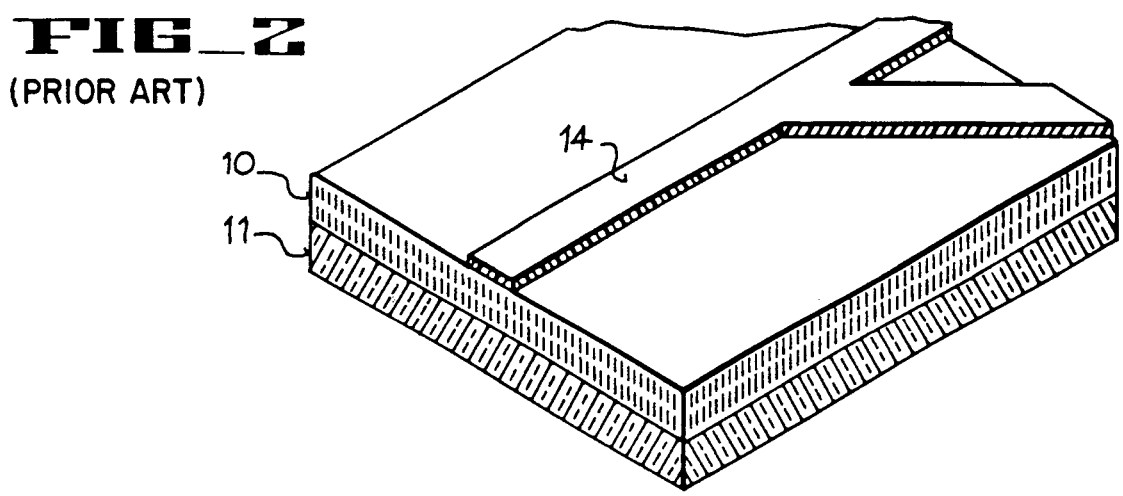
FIG_2 (PRIOR ART)
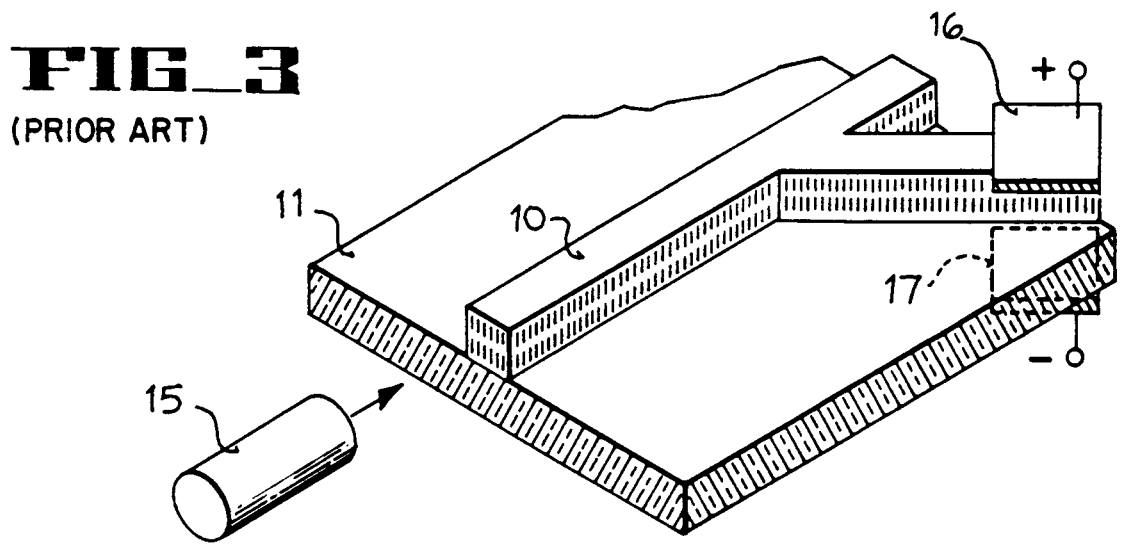
FIG_3 (PRIOR ART)

FIG_4
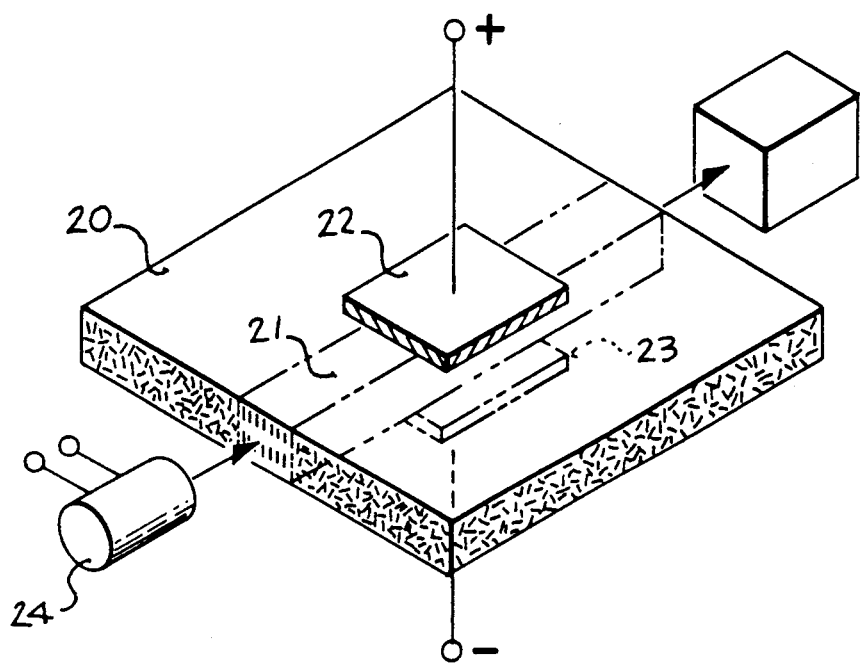
FIG_5
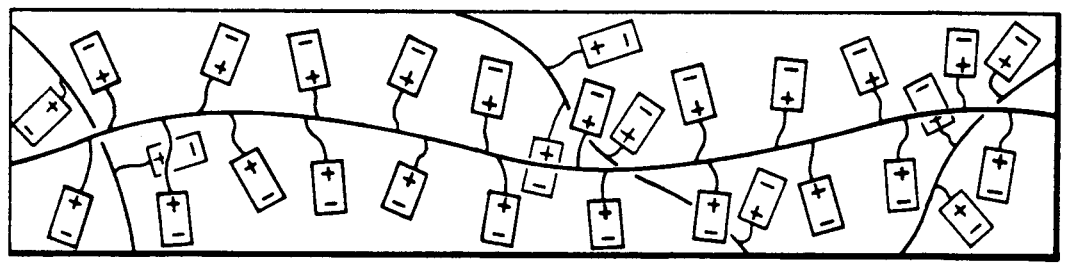
FIG_6
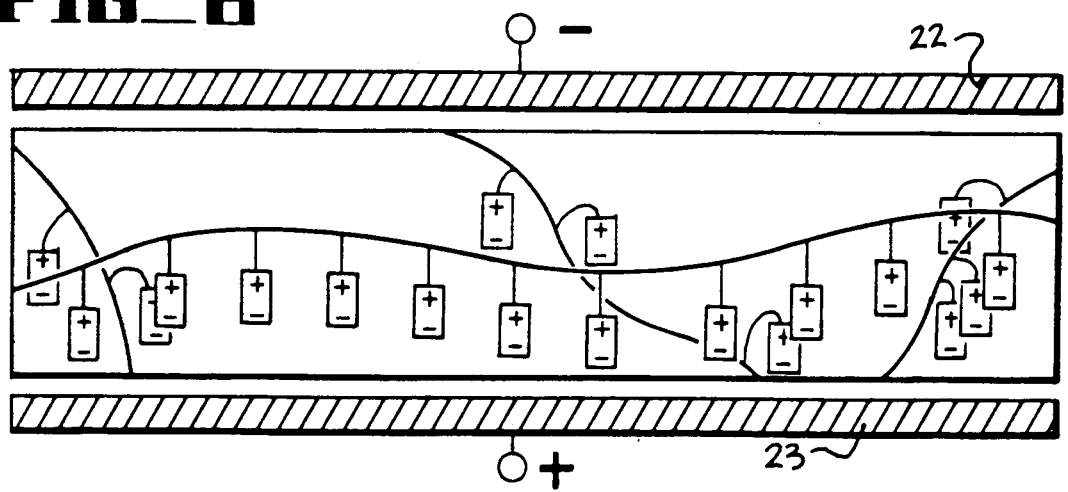

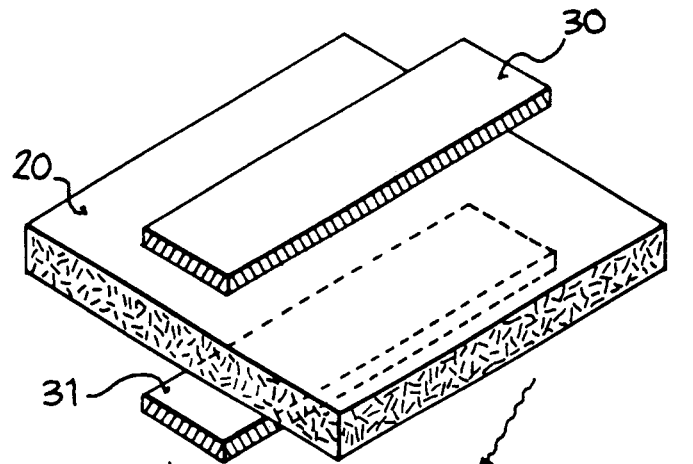
FIG_7
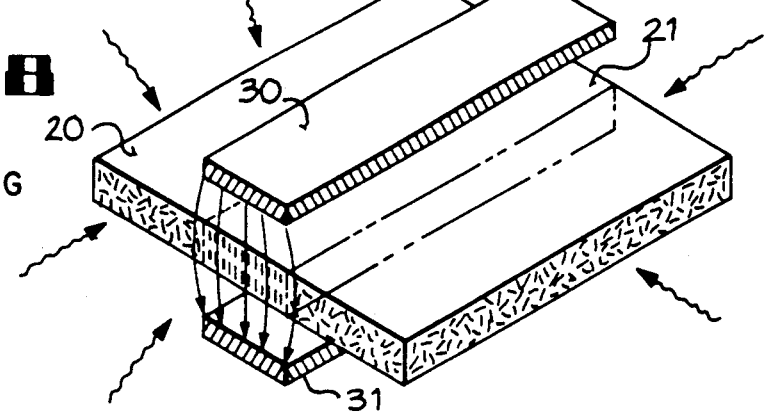
FIG_8
HEATING
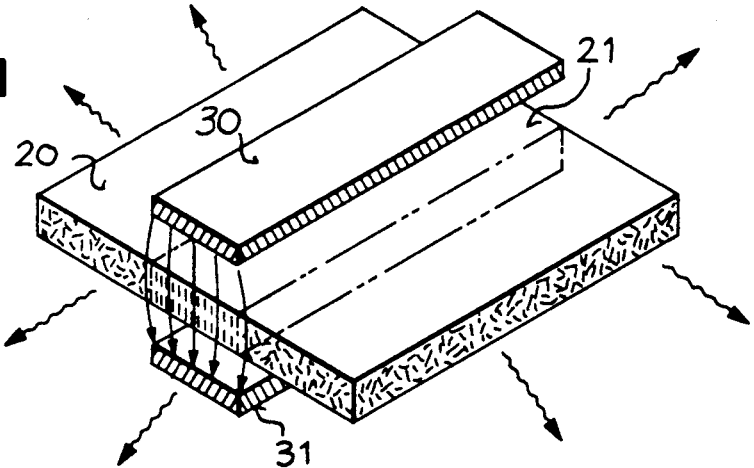
FIG_9
COOLING
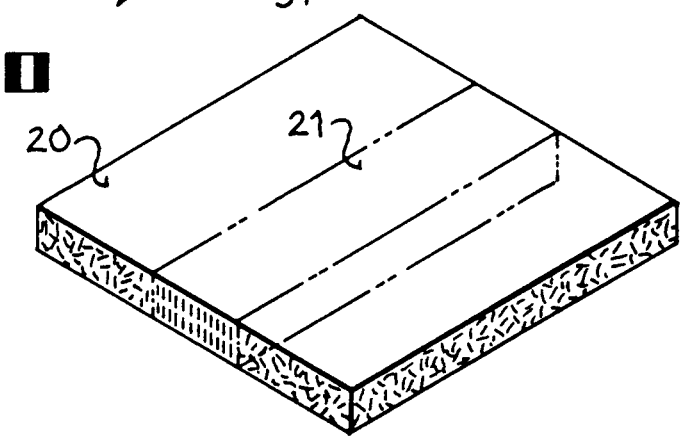
FIG_10

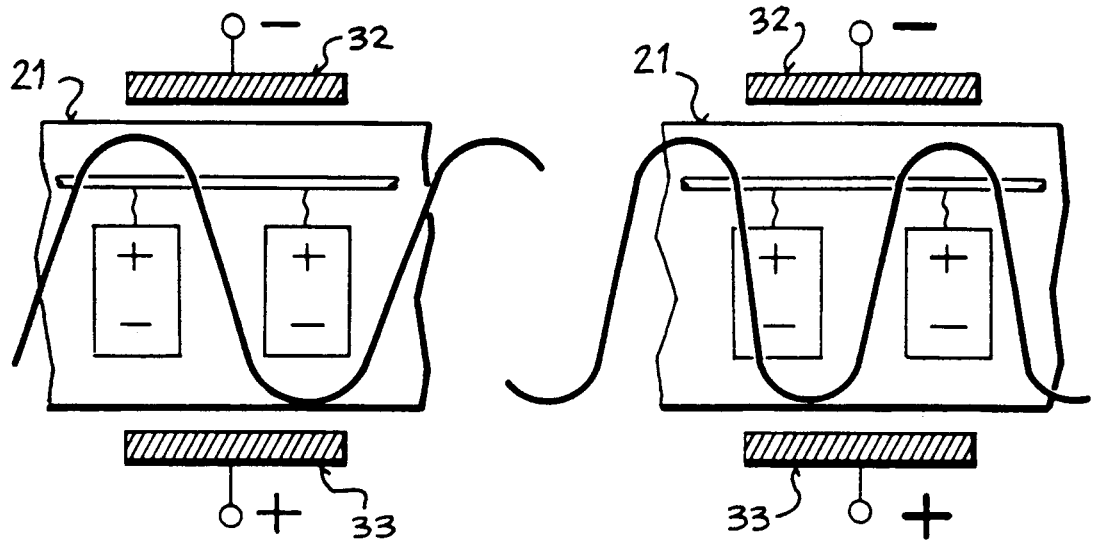
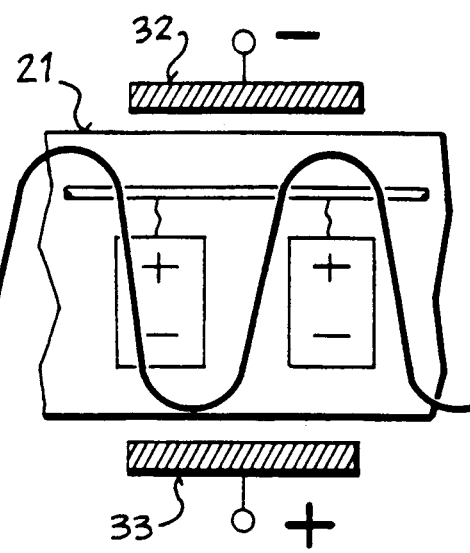
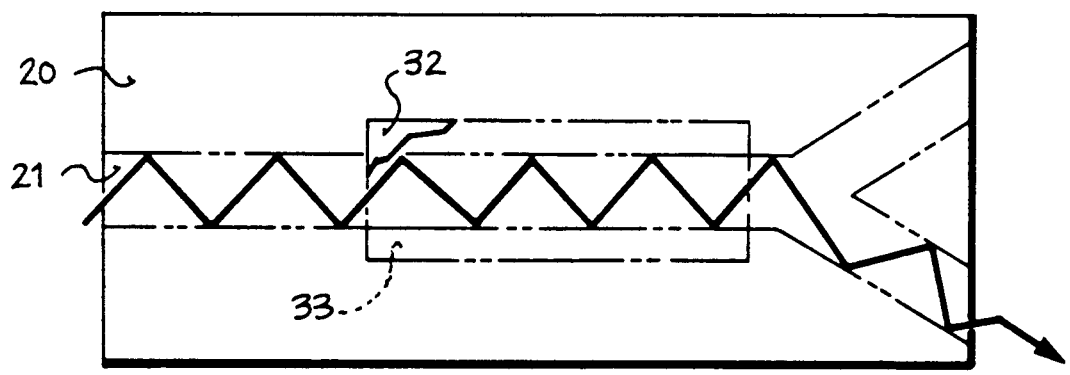
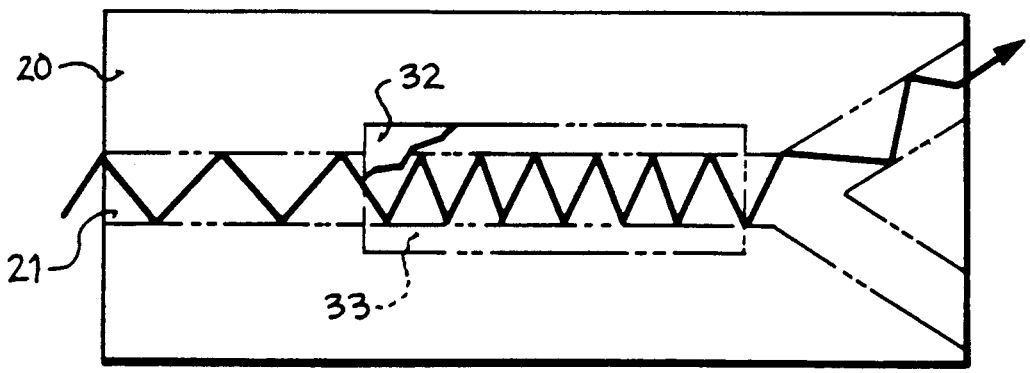

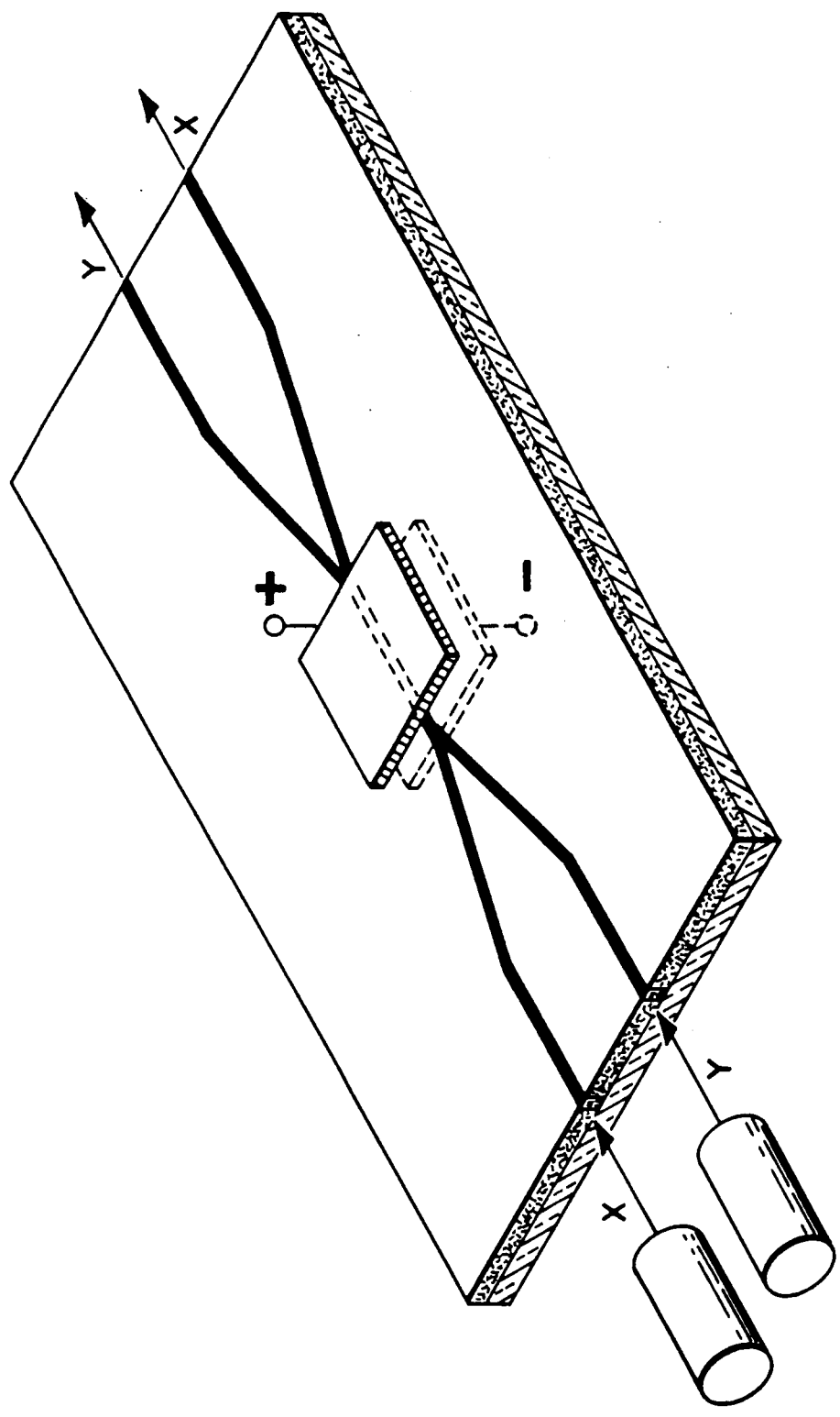
FIG_15

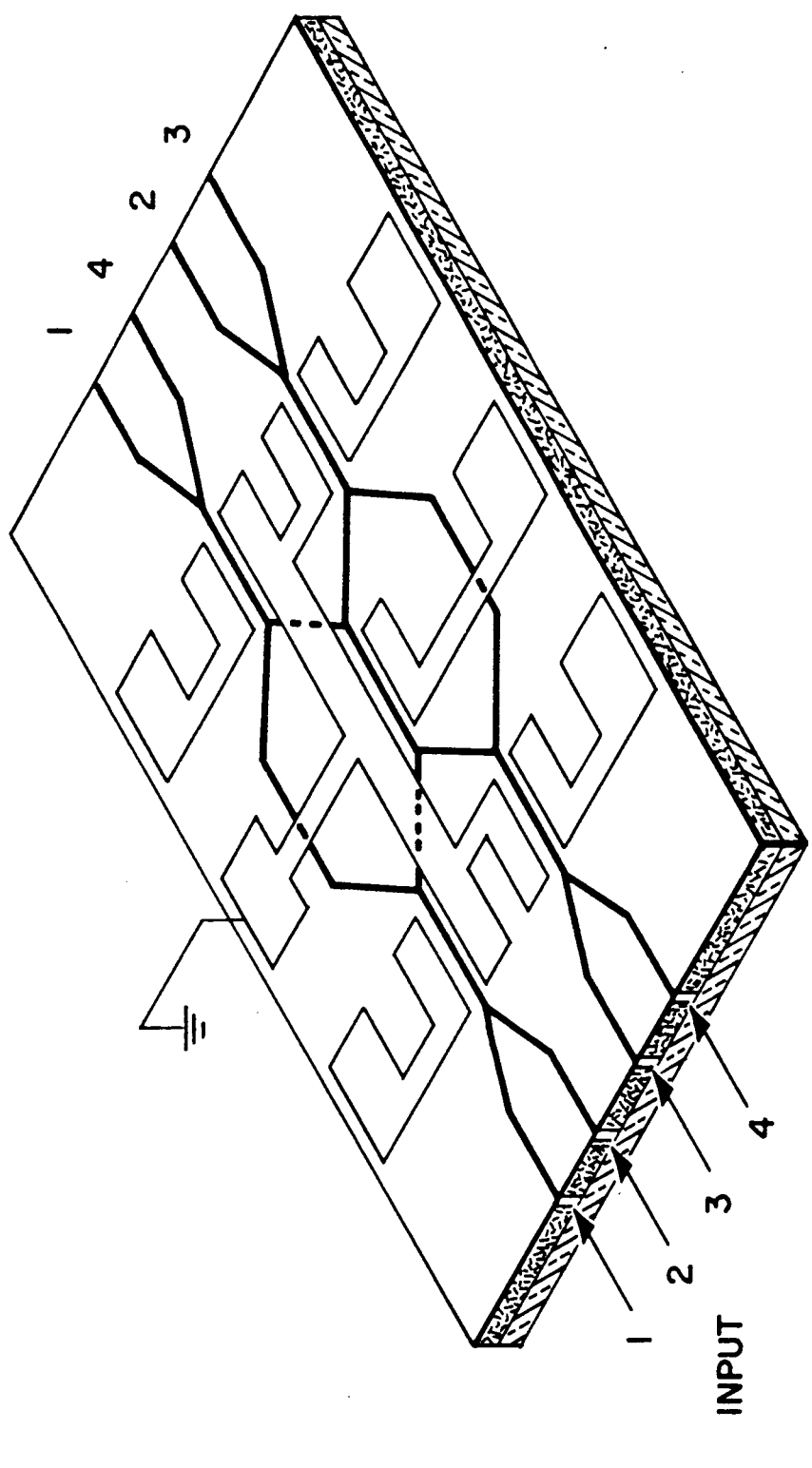
FIG_16

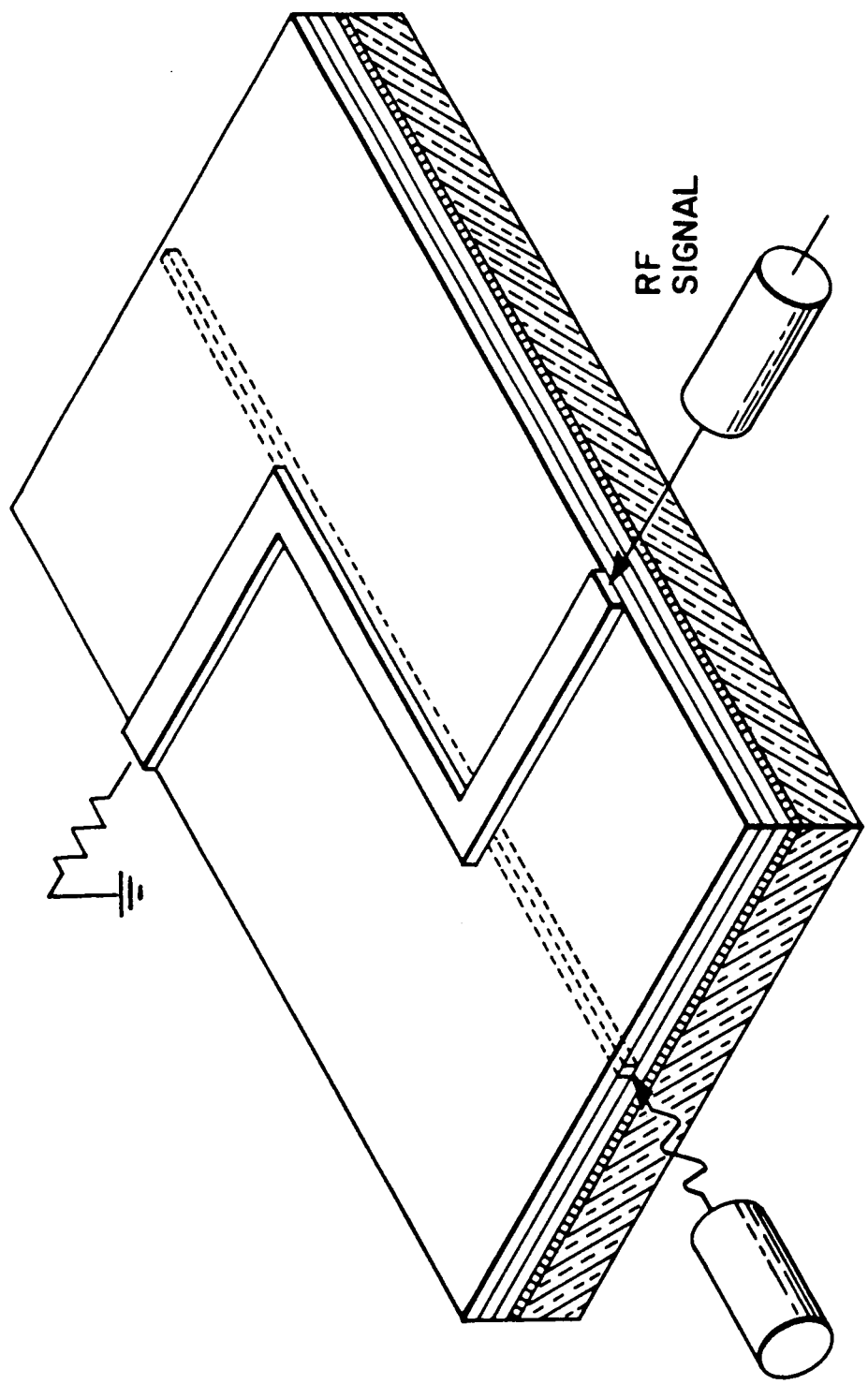
FIG_17

ELECTRO-OPTIC CHANNEL WAVEGUIDE

The United States Government has rights in this invention pursuant to Contract No. F49620-86-C-0129 awarded by the Department of the Air Force and Contract No. DAAL01-85-C-0197 awarded by the Department of the Army.

TECHNICAL FIELD

This invention relates generally to electro-optic channel waveguides, and more particularly to a technique for forming an electro-optic channel waveguide in a non-linear optical polymer structure.

BACKGROUND OF THE INVENTION

An electro-optic channel waveguide is a three-dimensional optical waveguide formed as a channel in a structure made of a non-linear optical material for the purpose of transmitting selected modes of optical radiation of desired polarization. The index of refraction in an electro-optic channel waveguide is greater for at least one polarization in at least one direction than the index of refraction in portions of the polymer structure adjacent the channel waveguide.

Techniques for fabricating three-dimensional optical waveguides made of thin-film materials are described in U.S. Pat. 4,767,169 granted on Aug. 3, 1988, which is assigned to Hoechst-Celanese Corporation. Typically, a thin-film optical waveguide is formed by: (1) coating a substrate with a first cladding layer (of, e.g., $SiO_2$); (2) etching a waveguide pattern in the first cladding layer; (3) providing an optical wave-guiding medium (e.g., an organic polymer) in the etched waveguide pattern; and (4) covering the optical wave-guiding medium and adjacent portions of the first cladding layer with a second cladding layer (also of, e.g., $SiO_2$). Electrode structures may be formed on the cladding layers in patterns determined by the intended function of the waveguide.

In general, techniques used to form thin films from organic electro-optic materials (e.g., spin techniques and dip-coating techniques) do not produce films that are electro-optic in character, because films produced by such techniques generally have a centrosymmetric bulk structure. A molecular alignment process is needed to form a noncentrosymmetric bulk structure in a thin film formed from an organic electro-optic material. An article by K. D. Singer et al., *J. Opt. Soc. Am.*, B4, 968 (1987), discusses an electrically induced poling technique for achieving molecular alignment in a thin-film organic electro-optic material. Furthermore, a technique for forming a thin film of organic electro-optic material does not generally produce a three-dimensional optical waveguide. A patterning technique is needed to produce a three-dimensional waveguide from the thin film of electro-optic material.

It was known in the prior art that when certain non-linear optical polymer materials are "poled" (i.e., when dipolar moieties of the constituent polymers of such materials are aligned), the indices of refraction of the materials are thereby altered. When a modulating electric field is applied to an optical waveguide made of such a poled non-linear optical polymer material, field-dependent changes are thereby superimposed upon the altered index of refraction that is characteristic of the poled polymer material. Thus, by applying a modulating electric field to an optical waveguide made of a poled non-linear optical polymer, phase modulation of optical radiation transmitted through the waveguide can be achieved.

A standard approach to the formation of optical waveguides from poled non-linear optical polymers is the "mask and etch" process, which is discussed by D. L. Lee in *Electromagnetic Principles of Integrated Optics*, (Wiley, New York, 1986), Chapter 7. Sequential steps in the "mask and etch" process are illustrated in FIGS. 1, 2 and 3.

As shown in FIG. 1, a layer 10 of a non-linear optical polymer is deposited by a conventional technique on a planar substrate 11 made of a chemically stable material such as a glass or fused silica. The substrate 11 with the layer 10 of polymer thereon is then sandwiched between a pair of electrodes 12 and 13 of opposite polarities to produce a poling electric field in the polymer. While the poling field is being maintained in the polymer, the polymer is heated to a temperature above the glass-transition temperature so that dipolar moieties of the polymer are brought to a mobile condition. The dipolar moieties, while in the mobile condition, are urged into alignment by the poling electric field. After a sufficient percentage of the mobile dipolar moieties have become aligned so as to raise the index of refraction of the polymer for a given polarization to a preselected value, the polymer is then cooled below the glass-transition temperature so as to return the dipolar moieties to a stable (i.e., non-mobile) condition while the electric field is still being maintained in the polymer. The electric field is maintained in the polymer for a sufficient time while the polymer is being cooled, so that the dipolar moieties remain permanently aligned after returning to the stable condition.

To form a waveguide (or network of waveguides) from the "poled" non-linear optical polymer material, a mask 14 is formed by a conventional photolithographic technique on the polymer layer 10 as indicated in FIG. 2. The mask 14 is configured to define the shape of the waveguide (or waveguide network). The portion of the polymer layer 10 that is not covered by the mask 14 is then removed from the substrate 11 by a conventional etching technique.

As shown in FIG. 3, only that portion of the polymer layer 10 comprising the waveguide (or waveguide network) remains on the substrate 11. A beam of optical radiation of preselected TM or TE modes generated by a source 15 is guided via the waveguide to a switching region, as determined by the type of device. The optical radiation propagated through the waveguide can be phase-modulated by disposing a pair of electrodes 16 and 17 of opposite polarities so as to impress an electric field on a portion of the waveguide, thereby superimposing field-dependent changes on the index of refraction of the waveguide.

In U.S. Pat. Nos. 3,801,185 (Ramaswamy et al.) and 3,802,760 (Sosnowski et al.), other techniques are disclosed for forming three-dimensional optical waveguides from certain types of thin-film materials for which the index of refraction can be altered by an applied electromagnetic field.

SUMMARY OF THE INVENTION

It is an object of the present invention to provide a technique for forming an electro-optic channel waveguide in a non-linear optical polymer structure.

It is also an object of the present invention to provide an optical waveguide device comprising a polymer structure made of a polymer having second-order molecular optical nonlinearities, where a channel waveguide is permanently formed in the polymer structure. Thus, an optical waveguide device according to the present invention does not require an applied electromagnetic field in order to maintain the waveguiding properties of the channel waveguide formed in the non-linear optical polymer structure.

Lateral confinement of guided optical radiation in one or two dimensions within the channel waveguide of an optical waveguide device according to the present invention is achieved by producing a differential index of refraction (i.e., a higher index of refraction) in the channel waveguide relative to the index of refraction in cladding portions of the polymer structure adjacent the channel waveguide. The differential index of refraction in the channel waveguide results from a differential alignment of dipolar moieties of the polymer in the channel waveguide relative to the orientations of dipolar moieties of the polymer in the cladding portions of the polymer structure. A channel waveguide formed in a non-linear optical polymer structure in accordance with the present invention is electro-optic, but could also be used as a passive optical waveguide (e.g., in an "interconnect" device).

A technique according to the present invention for forming an electro-optic channel waveguide in a non-linear optical polymer structure involves: (1) maintaining an electric field in a channel portion of the polymer structure; (2) maintaining the polymer structure at a temperature above the glass-transition temperature while the electric field is being maintained in the channel portion of the polymer structure, so that dipolar moieties of (or contained by) the polymer of which the structure is made become mobile, whereby the electric field aligns the dipolar moieties to produce a higher index of refraction in the channel portion than in non-channel portions of the polymer structure for at least one polarization; and (3) cooling the polymer structure below the glass-transition temperature while the electric field continues to be maintained in the channel portion of the polymer structure, so that the aligned dipolar moieties remain aligned as they become non-mobile.

DESCRIPTION OF THE DRAWING

FIGS. 1–3 illustrate three stages in the formation of a network of electro-optic waveguides in a thin film of a polable material such as an organic polymer in accordance with a technique of the prior art.

FIG. 4 is a perspective view of a polymer structure in which a channel waveguide is formed according to the present invention, and of a pair of switching electrodes positioned adjacent a portion of the channel waveguide to modulate the phase of optical radiation propagating through the channel waveguide.

FIG. 5 is a schematic view of a non-linear optical polymer of which the polymer structure of FIG. 1 is made, where dipolar moieties of the polymer are illustrated in random orientation.

FIG. 6 is a schematic view of the polymer of FIG. 5 in which the dipolar moieties are shown aligned by an applied electric field after the polymer has been heated above glass-transition temperature.

FIGS. 7–10 illustrate sequential steps in the formation of the channel waveguide in the polymer structure of FIG. 4.

FIGS. 11 and 12 schematically illustrate how a phase change is produced in a beam of optical radiation propagating through the channel waveguide in the polymer structure of FIG. 4 when the modulating electric field changes.

FIGS. 13 and 14 are schematic ray tracings showing how the direction of propagation of a beam of optical radiation can be switched from one branch to another branch of a channel waveguide by changing the phase of the beam by means of a modulating electric field.

FIG. 15 is a perspective view of a channel waveguide directional coupler according to the present invention.

FIG. 16 is a perspective view of a channel waveguide crossbar switch according to the present invention.

FIG. 17 is a perspective view of a channel waveguide phase modulator according to the present invention.

BEST MODE OF CARRYING OUT THE INVENTION

FIG. 4 shows a polymer structure 20 consisting of an organic polymer containing dipolar moieties, which possess second-order molecular nonlinearities. The polymer structure 20 is illustrated as a layer (which could have the thickness of a thin film) that would ordinarily be formed on a chemically stable substrate (not shown in FIG. 4).

In order for the polymer layer 20 to guide modes of optical radiation, the polymer and the material adjacent to it (i.e., a buffer or cladding) must be transparent at the wavelength of the optical radiation, and the cladding must have a lower refractive index than the polymer and must be of sufficient thickness to prevent optical radiation in the polymer layer 20 from being significantly affected by any materials beyond the cladding. The modes of optical radiation that are guided by the polymer layer 20 shown in FIG. 4, are confined in only one dimension: viz., the dimension perpendicular to the polymer layer 20. The guided modes are not confined in either lateral dimension.

Three-dimensional waveguides, both active (electro-optic) and passive, which confine guided modes of optical radiation in two dimensions are essential components of integrated optic devices. By partially orienting, or "poling", the optically active dipolar moieties in a selected region or regions of the polymer layer 20, a network of three-dimensional electro-optic (EO) waveguides can be formed in the polymer layer 20 in a single process. In general, the partial ordering of the optically active molecules allows components of the second-order molecular nonlinearities to add, thereby creating a region which exhibits the linear EO effect. Since most organic nonlinear molecules possess an anisotropic microscopic linear polarizability the poled region also becomes birefringent. The poled regions are uniaxial with the extraordinary refractive index, $n_e$, being oriented along the direction of the local poling field. If a portion of a thin-film polymer structure made of a polymer in which poling induces positive birefringence is poled with a poling field perpendicular to the film, TM waves propagating in the structure experience a greater refractive index, $n_e$, in the poled portion than in the surrounding unpoled portions of the structure, and so can be confined in the lateral dimension. On the other hand, TE waves encounter a lower refractive index, $n_o$, in the poled portions than in the surrounding unpoled portions of the polymer structure, and so are radiated from the structure. The reverse situation obtains when a portion of such a thin-film polymer structure is poled with a transverse electric field in the plane of the film. Of course the ordinary and extraordinary refractive indices are not scalar quantities in practice, and such nomenclature is used herein only for convenience. Waveguides formed as channel portions of polymer structures in which poling induces birefringence, as described hereinafter, are thus inherently operative as filters for polarized light.

As indicated schematically in FIG. 4, a channel portion 21 of the polymer layer 20 has been poled to align the dipolar moieties therein so as to produce a greater index of refraction in the channel portion 21 than in portions of the polymer layer 20 adjacent the channel portion 21 for at least one polarization of the optical radiation. A beam of optical radiation from a source 24 is thereby confined within the lateral dimension of the channel portion 21, which therefore functions as an optical waveguide. Also shown in FIG. 4, is a pair of electrodes 22 sod 23 of opposite electrical polarities, which are used to generate a modulating electric field to superimpose field-dependent changes on the greater index of refraction induced in the channel portion 21 by the poling process.

The dipolar moieties of the polymer of which the polymer layer 20 is made are indicated in FIG. 4 by short line segments. In the unpoled portions of the polymer layer 20, the dipolar moieties are randomly oriented. However, in the poled channel portion 21, the dipolar moieties are permanently aligned. FIG. 5 is a schematic representation of randomly oriented dipolar moieties of the polymer of which the polymer layer 20 is made. FIG. 6 schematically illustrates the poling of the dipolar moieties by an electric field applied during the formation of the waveguide channel 21 in the polymer layer 20.

A technique for forming an electro-optic channel waveguide in a non-linear optical polymer structure is illustrated in FIGS. 7-10. As shown in FIG. 7, two electrodes 30 and 31 are positioned on opposite sides of the polymer layer 20. The size of the electrodes 30 and 31 defines the size of the three-dimensional EO waveguide that is to be formed in the polymer layer 20. The polymer layer 20 must be brought to a mobile state in which the dipolar moieties can be partially oriented by a poling electric field, the magnitude of which is less than the magnitude of the breakdown field for the polymer in this mobile state. This can be accomplished by heating the polymer layer 20 to a temperature above its glass-transition temperature, as indicated in FIG. 8. When the polymer layer 20 is in the mobile state, the poling electric field applied by the electrodes 30 and 31 is maintained for a time sufficient to allow the dipolar moieties to become partially oriented in a direction parallel to the applied field direction. After the partial orientation of the dipolar moieties has occurred, the poling field is maintain while the polymer layer 20 is cooled below the glass-transition temperature, as indicated in FIG. 9, to a temperature range in which thermal relaxation of the dipolar moieties is long compared to the operational lifetime of the polymer layer 20. Once this poling procedure has been performed, the poling electrodes 30 and 31 are removed, leaving the three-dimensional channel waveguide 21 in the polymer layer 20, as indicated in FIG. 10. The unpoled portions of the polymer layer 20 act as cladding in the lateral dimension perpendicular to the channel waveguide 21. No further application of an electric field is needed to maintain the channel waveguide 21. The three-dimensional channel waveguide 21 is electro-optic, because the partial orientation of the dipolar moieties therein allows the second-order molecular nonlinearities to add so as to create a region which exhibits the linear EO effect.

The phase of a beam of optical radiation propagated through the channel waveguide 21 of the polymer layer 20 can be modulated by placing switching electrodes across the entire length, or across a section, of the channel waveguide 21. The switching electrodes must be spaced apart from the channel waveguide 21 by cladding portions of the polymer structure 20, or by cladding layers formed over the channel waveguide 21. Because of the linear EO effect, the application of a modulating electric field across the channel waveguide 21 by the switching electrodes changes the refractive index of the channel waveguide 21 in the region where the modulating field is applied. Little or no reorientation of the dipolar moieties is produced by the modulating electric field, since the polymer layer 20 is not in a state in which the dipolar moieties can rotate.

FIG. 11 provides a schematic depiction of a sinusoidal waveform representing the instantaneous electric field at a given instant in time of a beam of optical radiation propagating through a switching region (as defined by electrodes 32 and 33) of the channel waveguide 21. As indicated in FIG. 12, when the difference of electrical potential across the switching electrodes 32 and 33 is changed to increase the strength of the modulating electric field in the switching region, the bulk refractive index in the channel waveguide 21 is correspondingly increased due to the linear EO effect. The increase in the refractive index of the channel waveguide 21 imparts a phase shift to the beam of optical radiation propagating through the switching region. The channel waveguide 21 could, of course, act as a passive waveguide for optical interconnection purposes in which case the switching electrodes 32 and 33 would be omitted.

The technique of the present invention for forming a network of EO channel waveguides by a single process has several advantages over other procedures for fabricating organic EO waveguide devices. One advantage is simplification of the overall device fabrication process. Another advantage is that fringing of the poling fields tends to reduce the effects of electrode edge roughness on the roughness of the waveguide side boundaries, which is important because smooth side boundaries result in decreased propagation losses due to scattering from waveguide boundary irregularities. Channel waveguides formed using the technique of the present invention can be made to guide a single polarization. Therefore, a single polarization can be selected from an incoming optical signal, thereby facilitating operation of devices (e.g., directional couplers) that operate most efficiently on radiation of a single polarization.

FIG. 13 is a ray diagram illustrating a beam of optical radiation whose unmodulated phase is such as to cause the beam to be propagated through one branch of a Y-branching portion of the channel waveguide 21. As indicated in FIG. 14, the switching electrodes 32 and 33 can be used to apply a modulating electric field in a switching region of the channel waveguide 21, which changes the phase of the beam so as to switch the direction of propagation of the beam into the other branch of the Y-branching portion of the channel waveguide 21.

Two particular polymers useful in practicing the present invention, which are designated hereinafter as Polymer I and Polymer II are an isotropic 50/50 copolymer of 4-(6-methacryloxyhexyloxy)-4'-nitrostilbene and methyl methacrylate and an isotropic 50/50 copolymer of 4-[N-(2-methacroyloxyethyl)-N-methylamino]-4'-nitrostilbene and butyl methacrylate. These two polymers are referred to as PC6S and C22, respectively, in "Poled Electro-Optic Waveguide Formation in Thin-Film Organic Media," Thackara et al., *Appl. Phys. Lett.* 52 (13), 28 March 1988, the disclosure of which is incorporated herein by reference. The preparation of these polymers is described below.

POLYMER I

Following is a description of the preparation of an isotropic 50/50 copolymer of 4-(6-methacryloxyhexyloxy)-4'-nitrostilbene and methyl methacrylate. This Polymer I has the formula:

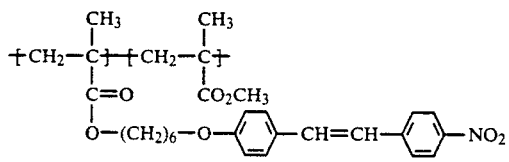

A. 4-hydroxy-4'-nitrostilbene

A 500 ml three-necked flask fitted with a mechanical stirrer, dropping funnel and argon inlet is charged with 54.3 g of 4-nitrophenylacetic acid, and a 25.6 g quantity of piperidine is added dropwise. After the addition is completed, the dropping funnel is removed and replaced with a condenser.

A 36.6 g quantity of 4-hydroxybenzaldehyde is added to the flask, and the reaction mixture is heated 3 hours at 100° C., 3 hours at 150° C., and then cooled to room temperature. The resultant solid mass is crushed and placed into a one liter beaker with 500 ml of 30% NaOH. After boiling for 30 minutes, the solution is cooled to room temperature and the crude solid product is filtered. The crude product is charged to a 4 liter beaker with 3 liters of water, and neutralized slowly with dry ice. The orange crude product is filtered, washed with water until the wash is colorless, and air dried. The product is recrystallized from acetic acid with charcoal, m.p. 204°-206° C. The potassium salt is prepared by dropwise addition of 10 g of KOH in 75 ml of water to a refluxing solution of 36 g of stilbene in 900 ml of ethanol. Upon cooling, blue crystals of the potassium salt separate. The crystalline solid is filtered and washed with tetrahydrofuran until the wash is colorless, to provide a 41 g yield of product.

B. 4-(6-hydroxyhexyloxy)-4'-nitrostilbene

To 500 ml of toluene in a one liter round bottom flask, fitted with a condenser and magnetic stirrer, is added 14 g (0.05 M) of 4-hydroxy-4'-nitrostilbene potassium salt, 14 g of 6-iodo-1-hexanol, and 0.5 g of 18-crown-6 ether. The mixture is refluxed for about 20 hours, and then the reaction medium is filtered hot, and the product crystallizes from the toluene on cooling, m.p. 154°-157° C.

C. 4-(6-methacryloxyhexyloxy)-4'-nitrostilbene

A one liter reaction flask is charged with 500 ml of 1,2-dichloroethane, and then with 9.0 g of 4-(6-hydroxyhexyloxy)-4'-nitrostilbene and 5 g of triethylamine. The reaction mixture is heated to 50° C., and 3.7 g of methacroyl chloride is added dropwise. The reaction mixture is stirred at 50° C. for about 5 hours, then an additional 3.7 g amount of methacroyl chloride is added, and the reaction mixture is stirred at 50° C. for a period of about 18 hours.

The resultant product solution is washed twice with water, dried over magnesium sulfate, and concentrated in vacuo. The crude solid product is recrystallized from ethanol, m.p. 90°-95° C.

D. Copolymer Product

A reaction flask is charged with 10 ml of dry toluene, 1.0 g (0.0024 mole) of 4-(6-methacryloxyhexyloxy)-4'-nitrostilbene, and 0.24 g (0.0024 mole) of methyl methacrylate as a 20% solution in toluene (2.4 ml). The reaction medium is purged with argon for one hour. A 2 ml quantity of 1% azobisisobutyronitrile solution is added to the reaction medium, and the polymerization is conducted at 60° C. for a period of about 18 hours.

The reaction product mixture is poured into a volume of methanol. The resultant solid precipitate is filtered, washed with methanol, and dried.

The copolymer exhibits a $T_g$ of 80° C. A homopolymer of 4-(6-methacryloxyhexyloxy)-4'nitrostilbene exhibits a $T_g$ of 45° C.

The above-described Polymer I is disclosed and claimed in copending U.S. Pat. No. 4,822,865 granted on Apr. 18, 1989, which is assigned to Hoechst-Celanese Corporation. The disclosure of U.S. patent application Ser. No. 120,253 is incorporated herein by reference.

POLYMER II

Following is a description of the preparation of an isotropic 50/50 copolymer of 4-[N-(2-methacroyloxyethyl)-N-methylamino]-4'-nitrostilbene and butyl methacrylate useful in practicing the present invention. This Polymer II is sometimes identified as C22, and has the formula:

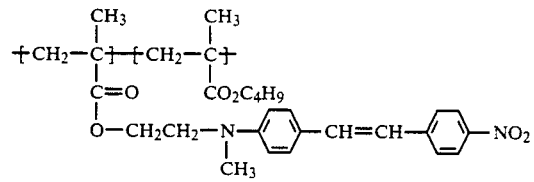

A. 4-[N-(2-hydroxyethyl)-N-methylamino]benzaldehyde

A 2 liter three-necked flask fitted with a mechanical stirrer, therometer and condenser is charged with 134 g of 2-(methylamino)ethanol, 74.4 g of 4-fluorobenzaldehyde, 1 ml of Aliquat 336, 750 ml of dimethylsulfoxide and 82.8 g of anhydrous potassium carbonate. The mixture is heated at 95° C. for three days. The product mixture is cooled and poured into 3 liters of ice water. The resultant solid precipitate is filtered, washed with water, and vacuum dried. The crude product is recrystallized from toluene, m.p. 72° C.

B. 4-[N-(2-hydroxyethyl)-N-methylamino]-4'-nitrostilbene

A one liter three-necked flask fitted with a dropping funnel, mechanical stirrer and condenser is charged with 34.35 g of 4-nitrophenylacetic acid, and piperidine (16.2 g) is added dropwise over a period of 30 minutes. At the end of the addition, a 33.62 g quantIty of 4-[N-(2-hydroxyethyl)-N-methylamino] benzaldehyde is added.

The mixture is heated at 100° C. for three hours, and at 130° C. for three hours. After cooling, the resultant semi-solid mass is ground in ethanol in a blender. The particulate solid is filtered, washed, and vacuum dried. The crude product is recrystallized from chlorobenzene, m.p. 185°-187° C.

C.
4-[N-(2-methacroyloxyethyl)-N-methylamino]-4'-nitrostilbene

A one liter three-necked flask fitted with a thermometer, condenser, dropping funnel with argon inlet and magnetic stirrer is charged with 5 g of 4-[N-(2-hydroxyethyl)-N-methylamino]-4'-nitrostilbene, 5 g of triethylamine and 400 ml of dichloromethane. The mixture is heated to 35° C., and 3.5 g of methacroyl chloride is added dropwise over a 30 minute period. After stirring at 35° C. for 4 hours, another 3.5 g of methacroyl chloride is added and the reaction medium is stirred for about 20 hours at 35° C. The product mixture is extracted three times with distilled water. The organic phase is dried over magnesium sulfate, and the solvent is evaporated. The resultant crude product is vacuum dried and then recrystallized from acetonitrile, m.p. 142°-148° C.

D. 50/50 Isotropic Acrylic Copolymer

4-[N-(2-methacroyloxyethyl)-N-methylamino]-4'-nitrostilbene (2 g) is suspended in 20 ml of chlorobenzene in a reactor, and the mixture is degassed one hour. To the suspension are added 0.776 g of butyl methacrylate (7.76 ml of a 10% solution in chlorobenzene) and one mole percent of azobisisobutyronitrile.

The reactor is capped and placed in a 75° C. oil bath for a period of about 18 hours. The product mixture then is poured into methanol to precipitate the copolymer. The solid copolymer is recovered by filtration, and vacuum dried.

The copolymer has a weight average molecular weight in the range of 60,000-80,000, and exhibits a $T_g$ of 92° C.

The above-described Polymer II is disclosed and claimed in U.S. Pat. No. 4,807,332 on Feb. 28, 1989 which is assigned to Hoechst-Celanese Corporation. The disclosure in U.S. patent application Ser. No. 106,301 is incorporated herein by reference.

Solutions of Polymer I and Polymer II used for spin coating are prepared by the following procedure: 10 g of the polymer (i.e., Polymer I or Polymer II, depending upon whichever solution is being prepared) are mixed with 40 g of 1,2,3-tri chloropropane and stirred for 48 hours at ambient temperature to form a transparent solution, which is yellow for Polymer I and red for Polymer II. The solution is further filtered through a Gelman filter with average pore size of 0.2 micron (Milipore No. 66477) at a low back pressure of about 2 psig. The filtered solutions of Polymer I and Polymer II are stored in amber colored bottles for later use in spin coating.

In EO devices with channel waveguides according to the present invention, which are designed to guide visible or near-infrared optical radiation, the dimensions of the channel waveguides are typically on the order of a few microns. Since both the polymer and the cladding layers for such EO devices are very thin, such devices are ordinarily fabricated on substrates.

EXAMPLE I

A poled EO channel waveguide was formed in a polymer structure consisting of Polymer I (i.e., the PC6S material) in the following manner. An indium tin oxide (ITO) electrode coating along a 12 mm×50 mm strip on one edge of an ITO-coated 25 mm×50 mm glass substrate was etched away using aqua regia at 50° C. A lower cladding layer was then formed on the ITO-coated substrate by spinning (using a standard photoresist spinner) and then curing a film of UV11-4M1 (a UV-curable epoxy marketed by Master Bond, Inc.) onto the ITO-coated substrate. The UV11-4MI was spun onto the substrate at 2500 rpm for 30 seconds, and was then cured for 15 minutes in a 12 mW/cm$^2$ beam at 365 nm from a high-pressure mercury lamp to produce a 3-micron thick cladding layer. The structure was then baked at 105° C. for one hour, and then cooled back to room temperature. A 2.5-micron thick film of PC6S material was then deposited on top of the UV11-4M1 layer by spin coating at 3000 rpm for 30 seconds. The structure was baked again at 105° C. for 18 hours, and then cooled back to room temperature. An L-shaped gold electrode was then deposited onto the PC6S layer with the long portion of the electrode being centered on the ITO-coated portion of the substrate. (The long portion of the electrode was 32 mm long and 150 microns wide.) The short portion of the electrode extended to the edge of the substrate where the ITO coating had been removed. The electrode was deposited by evaporating gold onto the PC6S layer through a mask. Electrical contacts to the ITO and gold electrodes were made using silver paint (marketed by E. F. Fullam, Inc.). Electrical contact to the gold electrode was made near the edge of the substrate where the ITO had been removed to avoid electrical breakdown between the two electrodes that might be caused by the silver paint. The structure was then heated to 92° C., and the PC6S material between the electrodes was poled for 5 minutes. A poling voltage of +500 V was applied to the upper electrode while the lower electrode was grounded. After the 5 minute poling period, the structure was cooled back to room temperature with the poling voltage applied. When the cooling was completed, the applied field was removed. The gold electrode was then removed using a standard puddle etch technique with dilute aqua regia (15 parts $H_2O$ to 15 parts HCl to 1 part $HNO_3$ by volume) at 25° C., and the structure was then rinsed in $H_2O$.

LaSF9 prisms were used to couple 830 nm radiation into and out from the poled channel waveguide. The extraordinary refractive index change induced in the channel region of the PC6S material due to the poling was 0.06. This value was calculated from measured coupling angles. Transverse magnetic (TM) modes were confined to the waveguide region, while transverse electric (TE) modes were radiated from the waveguide region. The propagation loss for the lowest order TM mode was measured to be −2.2 dB/cm in the unpoled region and −2.7 dB/cm in the poled channel waveguide region. These propagation losses were measured using a standard technique of measuring the outcoupled intensity of the lowest order TM mode for several separation distances between the outcoupling prism and the incoupling prism (the incoupling prism remaining in a fixed position).

A prototype directional coupler and a prototype traveling-wave phase modulator according to the present invention were fabricated using Polymer II (i.e., the C22 polymer material).

EXAMPLE II

A prototype TW phase modulator according to the present invention was fabricated by first depositing a copper electrode on a 25 mm × 75 mm glass substrate by thermal evaporation. A lower cladding layer was formed on the copper electrode by spinning (using a standard photoresist spinner) and then curing a film of UV11-4M1 (Master Bond, Inc.) onto the copper electrode. The UV11-4M1 was spun on at 2500 rpm for 30 seconds, and then cured for 15 minutes in a 12 mW/cm$^2$ beam at 365 nm from a high-pressure mercury lamp to produce a 3-micron thick cladding layer. The structure was baked at 105° C. for one hour, and then cooled back to room temperature. A 2.5-micron thick film of C22 was then deposited on top of the UV11-4M1 layer by spin coating at 3100 rpm for 30 seconds. The structure was baked again at 105° C. for 18 hours, and then cooled back to room temperature. A 2-micron thick upper cladding layer of GR651 (Owens Illinois, Inc.) was then deposited on a central 25 mm × 37 mm area of the structure by spreading a solution of GR651L - 35% solids (Owens Illinois, Inc.) in 2-propanol (3.5 parts GR651L to 6.5 parts 2-propanol by volume) onto the central 25 mm × 37 area from a 10 ml polypropylene syringe. The film was allowed to dry, and the structure was then baked at 90° C. for one hour. The upper electrode was deposited by evaporating copper onto the GR651 layer through a mask. The electrode was 150 microns wide, and the length of the middle straight section was 32 mm. The structure was then heated to 100° C., and the C22 material between the electrodes was poled for 15 minutes. A poling voltage of +700 V was applied to the upper electrode while the lower electrode was grounded. After the 15 minute poling period, the structure was cooled back to room temperature with the poling voltage applied. When the cooling was completed, the poling field was removed. Phase modulation produced by the TW phase modulator was detected by placing the device in one arm of a Mach-Zehnder interferometer and beating the modulator output against the external reference beam. Prism coupling was used to couple 830 nm radiation into and out of the modulator.

EXAMPLE III

A prototype directional coupler was fabricated according to the present invention in the following manner. An aluminum electrode, which defined the pattern of the channel waveguide and which remained to serve as one of the device electrodes, was formed on a 25 mm × 75 mm glass substrate by first evaporating a thin aluminum layer (approximately 0.1 micron) onto the substrate and then patterning the aluminum layer using a standard photolithographic technique. The aluminum electrode was made thin to minimize perturbations to spun layers deposited above it, which would have affected the waveguiding properties of the poled channel waveguide structure. The aluminum electrode consisted of two 7-micron wide straight sections brought to a 13-micron wide, 10 mm long straight common section at a crossing angle of 3 degrees. The common section was followed by a symmetric arrangement of two more 7-micron wide straight sections. The overall length of the aluminum electrode was 38 mm, and it was connected at one end to an aluminum contact pad which extended across one end of the substrate. A lower cladding layer was formed on the patterned aluminum electrode by spinning (using a standard photoresist spinner) and then curing a film of UV11-4M1 onto the aluminum electrode. The UV11-4MI was spun onto the aluminum electrode at 2500 rpm for 30 seconds, and was then cured for 15 minutes in a 12 mW/cm$^2$ beam at 365 nm from a high-pressure mercury lamp to produce a 3-micron thick cladding layer. The structure was then baked at 105° C. for one hour, and then cooled back to room temperature. A 1.7-micron thick film of C22 material was then deposited on top of the UV11-4M1 layer by spin coating at 5100 rpm for 30 seconds. The structure was baked again at 105° C. for 18 hours, and then cooled back to room temperature. A 2-micron thick upper cladding layer of GR651 (Owens Illinois, Inc.) was deposited on a central 25 mm × 45 area of the structure by spreading a solution of GR651L - 35% solids (Owens Illinois, Inc.) in 2-propanol (3.5 parts GR651L to 6.5 parts 2-propanol by volume) onto the central 25 mm × 45 area from a 10 ml polypropylene syringe. The film was allowed to dry, and the structure was then baked at 90° C. for one hour. A gold upper electrode was then deposited by thermal evaporation through a mask onto a 25 mm × 40 mm area of the GR651 layer above the patterned aluminum electrode. Electrical contacts to the gold and aluminum electrodes were made in a fashion similar to that described above for fabricating the poled waveguide in the PC6S polymer. The structure was heated to 105° C., and the C22 material between the electrodes was poled for 15 minutes. A poling voltage of +775 V was applied to the upper electrode while the lower electrode was grounded. After the 15 minute poling period, the structure was cooled back to room temperature with the poling voltage applied. When the cooling was completed, the poling field was removed. The device was completed by removing the gold electrode over the incoming and outgoing poled channel waveguides (i.e., by rubbing the gold off the GR651 layer in these areas). The portion of the gold electrode that remained over the common section served as the other device electrode.

LaSF9 prisms were used to couple 830 nm radiation into and out from the device. Light was coupled into one of the input poled channel waveguides, and partial switching of the guided optical radiation was observed between the output poled channel waveguides when voltages between 65 V and 120 V were applied to the gold electrode with the aluminum electrode being electrically grounded.

Directional couplers of optimized design according to the present invention are capable of nearly complete switching of guided optical radiation. FIG. 15 illustrates a directional coupler device in which two input branches of a channel waveguide formed in a polymer layer merge into a common section of the channel waveguide at a switching region of the device, and diverge from the common section into two output branches of the channel waveguide. A phase shift between the radiation modes supported in the common section of the channel waveguide and the radiation modes supported in either (or both) of the input branches of the channel waveguide can be produced by applying a modulating electric field in the switching region. The phase of the modulating electric field determines the particular output branch of the channel waveguide into which optical radiation propagating through either input branch is coupled. By way of illustration in FIG. 15, optical input signals X and Y introduced into corresponding input branches of the channel waveguide are shown crossing over (i.e., switching) to symmetrically opposite output branches of the channel waveguide.

In FIG. 16, a crossbar switch comprising an array of directional couplers of the type shown in FIG. 15 (which form a network of channel waveguides in a single polymer structure) is illustrated. The crossbar switch shown in FIG. 16 has five directional couplers comprising transversely poled EO channel waveguides. A large central electrode, which is positioned adjacent one side of each of five common sections of the network of channel waveguides to define five corresponding switching regions, is electrically grounded. Five other (smaller) electrodes are positioned adjacent respective common sections of the waveguide channels to enable individually controlled modulating electric fields to be applied in the corresponding switching regions. Each of these five smaller electrodes could have a positive or negative voltage (i.e., a voltage above or below ground potential) applied to it, as appropriate to accomplish a desired switching of optical signals. Thus, as illustrated in FIG. 16, by selectively controlling the voltages applied to the five smaller electrodes, signals fed to inputs 1, 2, 3 and 4 can be redirected to outputs 1, 4, 2 and 3, respectively.

FIG. 17 illustrates an electro-optic phase modulator device according to the present invention in which the means for applying a modulating electric field to a portion of an EO poled channel waveguide formed in a non-linear optical polymer structure comprises a radio-frequency waveguide positioned adjacent the portion of the channel waveguide to which the modulating electric field is to be applied.

The present invention has been described herein in terms of particular types of non-linear optical polymers and particular types of optical waveguide devices. Thus, two types of polymers containing dipolar moieties possessing second-order molecular nonlinearities were disclosed as appropriate constituents for the polymer structure in which the channel waveguide is formed. However, possible constituents for the polymer structure are not limited to organic copolymer systems as disclosed herein, but could also include other types of polymer systems such as guest/host systems. Specific types of electrode structures and cladding layers have also been disclosed for particular kinds of electro-optic channel waveguide devices. However, other types of devices embodying electro-optic channel waveguides according to the present invention would become apparent to practitioners skilled in the art upon perusal of the foregoing specification and the accompanying drawing. Therefore, the devices disclosed herein are to be considered as simply illustrative of the invention, which is defined more broadly by the following claims and their equivalents.

We claim:

1. A method of forming an electro-optic channel waveguide in a polymer structure that is initially substantially homogeneous, said polymer structure substantially consisting of a non-linear optical polymer, said method comprising the steps of:

(a) maintaining an electric field as a poling field in a selected portion of said initially homogeneous polymer structure, said poling field being patterned to define a configuration for said channel waveguide in said selected portion of said polymer structure;

(b) maintaining said polymer structure in a temperature range above glass-transition temperature for said polymer while said electric field is being maintained as said poling field in said selected portion of said polymer structure, said polymer structure being maintained above said glass-transition temperature for a time that is sufficient to cause dipolar moieties of said polymer in said selected portion of said polymer structure to become sufficiently aligned by said poling field so as to produce a higher index of refraction in said selected portion than in a portion of said polymer structure adjacent said selected portion, said higher index of refraction being sufficient to support a guided mode of optical radiation of at least one polarization in said selected portion of said polymer structure so that said selected portion of said polymer structure acquires a transitory capability of functioning as a channel waveguide; and (c) cooling said polymer structure below said glass-transition temperature while said poling field continues to be maintained in said selected portion of said polymer structure, said poling field being maintained in said selected portion of said polymer structure for a sufficient time as said polymer structure is being cooled below said glass-transition temperature so that said capability of said selected portion of said polymer structure of functioning as a channel waveguide ceases to be merely transitory and becomes relatively permanent because, when said polymer structure has been cooled below said glass-transition temperature, the aligned dipolar moieties of said polymer in said selected portion of said polymer structure achieve thermal relaxation only after a time that is long relative to a useful lifetime of said polymer structure in an application utilizing said selected portion of said polymer structure as said channel waveguide.

2. The method of claim 1 wherein said electric field is applied to said channel portion of said polymer structure, and then heat is applied to said polymer structure to bring said polymer structure to a temperature above the glass transition temperature while said electric field is being maintained in said channel portion of said polymer structure.

3. The method of claim 1 wherein heat is applied to said polymer structure to bring said polymer structure to a temperature above the glass-transition temperature, and then said electric field is applied to said channel portion of said polymer structure while said polymer structure is being maintained above the glass-transition temperature.

4. The method of claim 1 wherein said electric field is maintained in said channel portion of said polymer structure by means of a pair of electrodes of opposite electrical polarities.

5. The method of claim 4 wherein the electrodes of said pair are disposed on opposite sides of said polymer structure.

6. The method of claim 4 wherein the electrodes of said pair are disposed adjacent each other on one side of said polymer structure.

7. The method of claim 4 wherein the electrodes of said pair are in contact with said polymer structure.

8. The method of claim 4 wherein the electrodes of said pair are spaced apart from said polymer structure to accommodate a buffer between said polymer structure and said electrodes.

9. A method of forming a three-dimensional optical waveguide in a polymer structure that is initially substantially homogeneous, said polymer structure substantially consisting of a polymer having dipolar moieties, said method comprising the steps of:

(a) maintaining an electric field as a poling field in a selected portion of said polymer structure, said poling field being patterned to define a configuration for said optical waveguide in said selected portion of said polymer structure;

(b) causing the dipolar moieties of said polymer to assume a generally mobile condition while said poling field is being maintained in said selected portion of said polymer structure, said dipolar moieties being maintained in said generally mobile condition for a time sufficient for said dipolar moieties in said selected portion to become sufficiently aligned by said poling field so as to produce a higher index of refraction in at least one direction in said selected portion of said polymer structure than in a portion of said polymer structure adjacent said selected portion, said higher index of refraction being sufficient to support a guided mode of optical radiation of at least one polarization in said selected portion, said selected portion of said polymer structure thereby acquiring a transitory capability of functioning as an optical waveguide; and (c) causing the dipolar moieties of said polymer to return to a generally stable condition while said poling field continues to be maintained in said selected portion of said polymer structure, said poling field being maintained in said selected portion of said polymer structure for a sufficient time as the dipolar moieties of said polymer return to said generally stable condition so that said capability of said selected portion of said polymer structure of functioning as a channel waveguide ceases to be transitory and becomes relatively permanent because the aligned dipolar moieties in said selected portion of said polymer structure achieve thermal relaxation only after a time that is long relative to a useful lifetime of said polymer structure in an application utilizing said selected portion of said polymer structure as said three-dimensional optical waveguide.

* * * * *